United States Patent Office 2,899,308
Patented Aug. 11, 1959

2,899,308

POULTRY FEED

Charles M. Ely, Livingston, and John R. Foy, Bayonne, N.J., assignors to Nopco Chemical Company, Harrison, N.J., a corporation of New Jersey No Drawing. Application February 23, 1956
Serial No. 567,077

10 Claims. (Cl. 99—4)

This invention relates to a new and effective way to improve the rate of growth and, more importantly, the efficiency of feed utilization in poultry.

It is known from U.S. Patents No. 2,340,063, No. 2,604,401 and No. 2,604,402 that the addition of up to two-tenths of one percent of a surface active agent such as an alkyl aryl sulfonate, a sodium salt of ethylene diamine tetraacetic acid or a fatty acid ester of a polyethylene glycol to a poultry feed will accelerate to some extent the rate of growth of poultry which is fed such a feed.

It is also known from U.S. Patent No. 2,717,209 that if from 0.05% up to 0.50% of a sodium soap of a fatty acid is added to the diet of chicks, growth will be accelerated by an appreciable amount. It is stated in the patent that the actual food efficiency, i.e. the gain in weight in relation to the total amount of food consumed is not affected by the addition of soap to the diet. The patentees of U.S. Patent No. 2,717,209 (one of the present applicants is one of those patentees) reported in detail on their work in a bulletin "Surface Active Agents as Growth Stimulators in Chick Rations" published in 1952 by the Research Division of the National Distillers Products Corporation. This publication pointed out that some commercial laundry products were successful in promoting growth and of those that were successful the optimum level for use was about 0.25% based on the weight of the feed. Table VII (page 19) of that publication shows the results obtained with the commercial laundry products tested. None of the commercial laundry products are specifically identified in the publication. However of the eleven tests reported on products of this type, nine used 0.22% of the product based on the weight of the feed, one used 0.11% and the other used 1.0%. The product that was used in an amount of 1.0% gave a greatly reduced feed efficiency and only an insignificant increase in growth. This product was a commerical synthetic detergent which was a mixture of an alkyl aryl sulfonate and sodium and potassium phosphates. No tests were reported in which more than 0.22% of a soap of a fatty acid was used.

It is the object of this invention to provide a new means for improving the rate of growth of poultry and, more importantly, it is the object of this invention to provide a highly efficient means for greatly improving the efficiency of feed utilization by poultry.

We have found that the objects of the invention may be readily accomplished by adding from just in excess of 0.5% up to and including about 2% by weight of a sodium or potassium soap of a fatty acid containing from 12 to 22 carbon atoms to a poultry feed which is already complete in all recognized growth factors. The efficiency of feed utilization of poultry which is fed such feed is as much as 10% greater than that of poultry fed the same feed which has not had such a soap added to it. In addition the rate of growth of poultry which is fed such a feed is normally somewhat greater than that of poultry which receives the same feed that has not had the soap added to it.

Although any of the sodium or potassium soap of fatty acids containing from 12 to 22 carbon atoms or mixtures of any of such soaps may be employed, we prefer to employ the sodium soap of tallow fatty acids, commonly referred to as sodium stearate or the sodium soaps of rice bran oil. The sodium soaps of tallow fatty acids are primarily a mixture of approximately equal parts of sodium palmitate and sodium stearate with some sodium oleate being present, the amount of sodium oleate present depending upon the number of times the tallow has been subjected to a pressing operation to remove the liquid fatty acids. Both the sodium soaps of tallow and of rice bran oil have given very excellent results with the most outstanding results being obtained with the rice bran oil soaps.

Although the concentration of the soap may vary from just in excess of 0.5% up to about 2% by weight of the poultry feed, we have found that the optimum results are obtained when approximately 1% of soap based on the weight of the poultry feed is employed. If desired, of course, the soap can be incorporated into the drinking water furnished to the poultry although it is preferred in most cases that the soap be incorporated into the dry poultry feed.

The following illustrative examples of our invention show quite clearly the results obtained by incorporating one of the soaps referred to above in a poultry feed:

EXAMPLE I

Eight lots of chickens, each lot consisting of seventeen New Hampshire chicks, were fed from one day of age to seventy days of age under a carefully controlled environment with each lot being housed in multi-deck wire batteries and with each lot being provided the same amount of floor space and the same physical equipment.

One of the lots of chicks served as the control lot and was fed a poultry feed recommended by the Beltsville, Maryland, Poultry Research Unit of the United States Department of Agriculture. This feed had the following composition:

*U.S.D.A. recommended broiler ration*

| Ingredient | Lbs./Cwt. | Lbs./Ton |
|---|---|---|
| Yellow Corn Meal | 67.35 | 1,347 |
| Soybean Oil Meal | 24.00 | 480 |
| Menhaden Fish Meal | 6.00 | 120 |
| Steamed Bone Meal | 1.00 | 20 |
| Ground Limestone | 1.00 | 20 |
| Iodized Salt | .34 | 6.8 |
| 25% Choline Chloride | .13 | 2.6 |
| Vitamin $B_{12}$ Supplement (6 mg./lb.) | .10 | 2.0 |
| Manganese Sulfate | .02 | .4 |
| Supplemental Vitamin Mix [1] | .06 | 1.2 |
| | 100.00 | 2,000.0 |

[1] Consisting of 16.0 grams vitamin "A" supplement (10,000 units/gm.); 3.6 grams vitamin $D_3$ supplement (15,000 units/gm.); 7.1 grams riboflavin supplement (1 gm. riboflavin per ounce); 500 milligrams niacin. (Total wt. equals 27.2 gms. or .06 pound.)

The above poultry feed has been thoroughly tested at the Beltsville Poultry Research Unit and it is known to contain all the essential nutrients required by young chickens.

The other seven lots of New Hampshire chicks were also fed the Beltsville poultry feed but the feed which was given to these seven lots of chicks contained 0.125%, 0.25%, 0.50%, 1.00%, 2.00%, 4.00% and 8.00%, respectively, of sodium stearate, with the sodium stearate being added to the poultry feed on a direct pound-for-pound substitution basis. The eight lots of chicks were then fed under identical conditions for a period of 70 days.

The average weight of the chickens in each lot at the end of the feeding period and the efficiency of feed utilization by the chickens in each lot are given in the following table.

TABLE I

|  | Pounds of Feed Required Per Pound of Gain | Average Weight at Seventy Days, gms. |
|---|---|---|
| Control Lot | 2.798 | 1,357 |
| 0.125% Soap | 2.660 | 1,345 |
| 0.25% Soap | 2.661 | 1,353 |
| 0.50% Soap | 2.711 | 1,408 |
| 1.00% Soap | 2.594 | 1,427 |
| 2.00% Soap | 2.644 | 1,385 |
| 4.00% Soap | 2.473 | 1,358 |
| 8.00% Soap | 2.635 | 1,283 |

It will be noted that the chickens fed 0.125%, 0.25% and 4.0% of sodium stearate grew at approximately the same rate as the chickens in the control group while those fed 0.50%, 1.0% and 2.0% of soap grew somewhat faster than the chickens in the control group.

What is much more important, however, is the fact that the efficiency of utilization of the feed by the chickens which received the sodium stearate was far superior at all levels to that of the chickens which did not receive the sodium stearate. Furthermore, it is clear from the data given in Table I that both the rate of growth and the feed efficiency of the control group were very satisfactory and therefore it is highly significant that such highly superior results were obtained when the soap was added to the diet.

We wish to point out that none of the levels of sodium stearate proved toxic to the chickens although the 8% level did reduce the palatability of the feed to a slight extent, which accounts for the slightly slower rate of growth in that lot of chickens as compared with the control lot.

The above results were completely unexpected since it could not be anticipated that the soap would have such an outstanding effect upon the efficiency of feed utilization. The outstanding economic importance of this discovery can be readily shown by comparing the results obtained in the lot which was fed 1% of soap with the results obtained in the control group. This is illustrated by the following tabulation:

TABLE II

| Per Bird | Control Lot | 1% Soap |
|---|---|---|
| Amount of Feed Used. | 8.394 lbs | 8.145 lbs. |
| Cost of Feed Used | 42.0¢ ($5.00 per cwt.) | 41.7¢ ($5.12 per cwt.). |
| Cost of Day Old Chick. | 18.0¢ | 18.0¢. |
| Overhead (Fuel, Labor, etc.). | 14.0¢ | 14.0¢. |
| Total Cost Per Bird | 74.0¢ | 73.7¢. |
| 70 Day Weight | 2.99 lbs | 3.14 lbs. |
| Value @ 28¢ lb | 83.7¢ | 88.0¢. |
| Profit Per Bird | 9.7¢ | 14.3¢. |

The above tabulation shows that based on a selling price of 28¢ per pound for the 70 day old birds, the profit per bird was 4.6¢ greater with those birds which received 1% of soap in their feed than with the birds which did not get any soap in their feed. On a percentage basis this is 47% greater than the profit which could be realized from the birds in the control group. Certainly anything which can increase a farmer's profits by about 50% over his usual methods of operation is an extremely outstanding discovery and is of great value in increasing the total income he can obtain on any given capital investment.

EXAMPLE II

Two lots of chickens, a control lot consisting of nineteen New Hampshire chicks and a test lot consisting of eighteen New Hampshire chicks, were fed from one day of age to seventy days of age under the same environmental conditions as were employed in Example I.

Both lots of chicks were fed the Beltsville poultry feed employed in Example I except that the feed in this case was fortified with a commercial vitamin supplement having the following composition for each ten pounds of supplement:

| Vitamin A | U.S.P. Units | 2,500,000 |
|---|---|---|
| Vitamin $D_3$ | I.C. Units | 1,000,000 |
| Riboflavin | gm | 3.0 |
| Pantothenic acid | gm | 3.0 |
| Niacin | gm | 20.0 |
| Choline | gm | 200.0 |
| Procaine penicillin | gm | 3.0 |
| Vitamin E | I.U. | 1,500 |
| Vitamin $B_{12}$ | mg | 4.0 |
| Trace minerals | gm | 140 |

The above supplement was used at the rate of ten pounds of supplement per ton of feed.

The only difference in the feed given to the control lot and the test lot was that the feed for the test lot contained 1.00% by weight of the sodium soap of rice bran oil.

The average weight of the chicks in the control lot at the end of the seventy day period was 1,370 gms. whereas the average weight of the chicks in the test lot at the same time was 1,654 gms. The control lot required 2.581 pounds of feed for each pound of gain whereas the test lot required only 2.497 pounds of feed for each pound of gain.

Calculating the profit per bird in the same manner as in Example I showed that a profit of 23.5¢ per bird was obtained with the test lot as compared to a profit of 13.5¢ per bird for the control lot. Thus the presence of the 1% of rice bran oil soap in the feed of the test lot resulted in a profit 74.1% greater than was obtained with the control lot.

This application is a continuation-in-part of our co-pending application Serial No. 481,011 filed January 10, 1955.

Having described our invention, what we claim as new and desire to secure by Letters Patent is:

1. A method for improving the rate of growth and feed efficiency of poultry which comprises introducing into the feed consumed by said poultry, a soap selected from the group consisting of sodium and potassium soaps of fatty acids containing from 12 to 22 carbon atoms, the amount of soap which is present being from just in excess of 0.5% up to about 2.0% of the air dry weight of the amount of poultry feed which is fed to the poultry.

2. The method of claim 1 wherein the soap is the sodium soap of tallow fatty acids.

3. The method of claim 1 wherein the soap is the sodium soap of rice bran oil.

4. The method of claim 2 wherein about 1.0% of soap based on the air dry weight of the amount of poultry feed which is fed to the poultry is employed.

5. The method of claim 3 wherein about 1.0% of soap based on the air dry weight of the amount of poultry feed which is fed to the poultry is employed.

6. A poultry feed comprising the usual feed ingredients of a poultry feed and in addition from just in excess of 0.5% up to about 2.0% by weight of a soap selected from the group consisting of sodium and potassium soaps of fatty acids containing from 12 to 22 carbon atoms.

7. The poultry feed of claim 6 wherein the soap is the sodium soap of tallow fatty acids.

8. The poultry feed of claim 6 wherein the soap is the sodium soap of rice bran oil.

9. The poultry feed of claim 7 wherein about 1.0% of soap based on the air dry weight of the poultry feed is employed.

10. The poultry feed of claim 8 wherein about 1.0% of soap based on the air dry weight of the poultry feed is employed.

References Cited in the file of this patent

UNITED STATES PATENTS 2,717,209    Ely et al. _____ Sept. 6, 1955

OTHER REFERENCES

Distillers Feed Conference, March 12, 1952, pp. 72–84, Distillers Feed Research Council, Cincinnati 2, Ohio.

Ault et al.: Chemurgic Digest, December 1954, pp. 4, 5 and 19.